United States Patent [19]

Rappen

[11] Patent Number: 5,318,168
[45] Date of Patent: Jun. 7, 1994

[54] DISC RETARDING CONVEYOR

[75] Inventor: Albert Rappen, Mülheim Ruhr, Fed. Rep. of Germany

[73] Assignee: VSR Engineering GmbH Fordertechnik, Mulheim/Ruhr, Fed. Rep. of Germany

[21] Appl. No.: 859,512
[22] PCT Filed: Dec. 6, 1990
[86] PCT No.: PCT/EP90/02107
§ 371 Date: Jun. 8, 1992
§ 102(e) Date: Jun. 8, 1992
[87] PCT Pub. No.: WO91/08156
PCT Pub. Date: Jun. 13, 1991

[30] Foreign Application Priority Data

Dec. 6, 1989 [DE] Fed. Rep. of Germany ....... 3939743

[51] Int. Cl.⁵ .................................................. B65G 19/14
[52] U.S. Cl. .................................. 198/716; 198/731; 198/733
[58] Field of Search ................ 198/716, 729, 731, 733

[56] References Cited

U.S. PATENT DOCUMENTS

| | | |
|---|---|---|
| 1,321,811 | 11/1919 | Dellenbach .......................... 198/733 |
| 2,235,991 | 3/1941 | Hapman . |
| 2,476,040 | 7/1949 | Hapman . |
| 2,586,538 | 2/1952 | Hapman . |
| 4,890,723 | 1/1990 | Debuisson et al. .................. 198/716 |

FOREIGN PATENT DOCUMENTS

| | | |
|---|---|---|
| 0005942 | 12/1979 | European Pat. Off. . |
| 2710515 | 10/1977 | Fed. Rep. of Germany . |
| 2809687 | 9/1978 | Fed. Rep. of Germany . |
| 370790 | 1/1988 | Fed. Rep. of Germany . |
| 1162757 | 9/1958 | France . |
| 1459708 | 11/1959 | France . |
| 2347283 | 11/1977 | France . |
| 2383095 | 6/1978 | France . |
| 2383096 | 10/1978 | France . |
| 2111935 | 7/1983 | United Kingdom . |

*Primary Examiner*—Joseph E. Valenz
*Attorney, Agent, or Firm*—Tarolli, Sundheim & Covell

[57] ABSTRACT

A disc retarding conveyor comprises at least one continuous tractive element. At least two-part static plates are mounted on the tractive element. The static plates are separated from each other at a distance in the tractive direction. The static plates are divided in the cross-sectional plane of the tractive element into two preferably identical halves. Each half has a radial cut hole which permits the halves of the static plate to be mounted concentrically onto the tractive element.

17 Claims, 3 Drawing Sheets

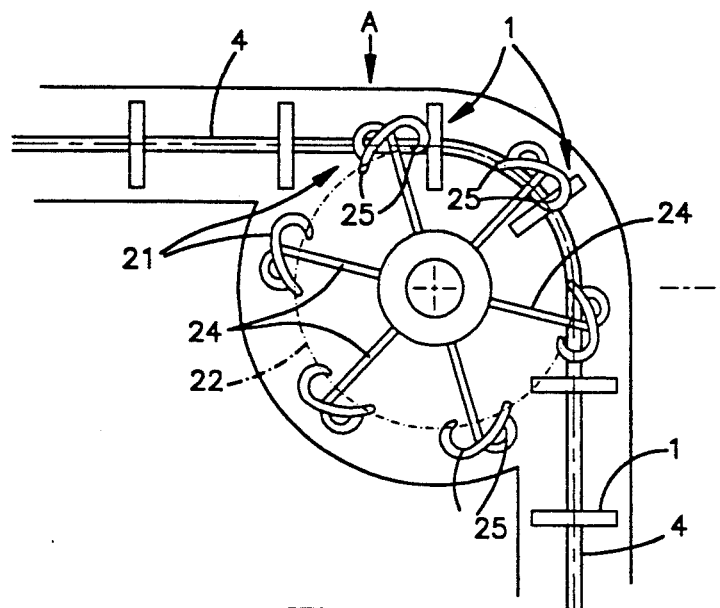
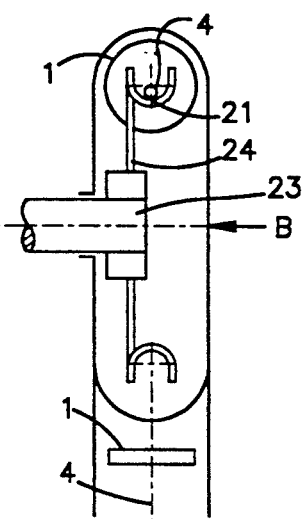
Fig.6    Fig.7
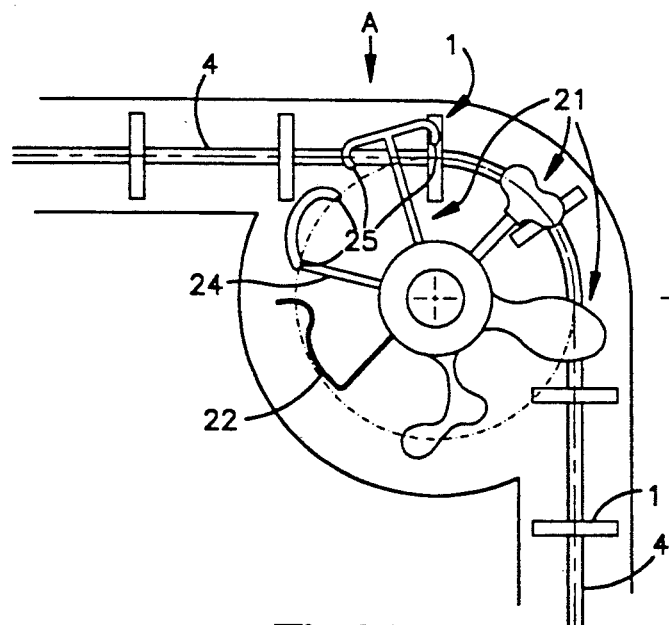
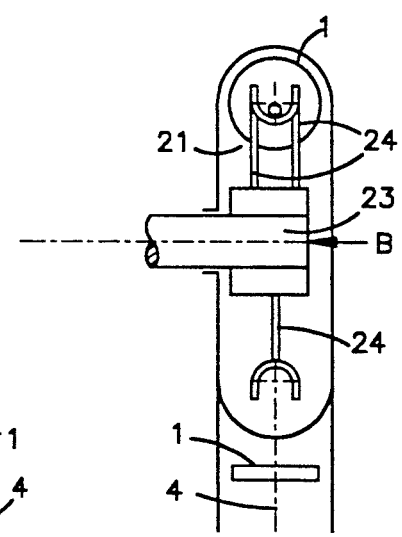
Fig.8A    Fig.8B

DISC RETARDING CONVEYOR

FIELD OF THE INVENTION

The invention pertains to a disc retarding conveyor.

BACKGROUND ART

The state of the art is that disc retarding conveyors move the carried, loose material by discs that are screwed or cast onto individual chain elements of the solid chain. Due to the meshing of the teeth into the diversion and drive stations of the individual chain elements, these disc retarding conveyors are very loud when in operation and have various other disadvantages. The disc retarding conveyor can be improved with a solid, smooth traction device, e.g., a steel cable. In this case, individual nodes and press-pieces are squashed onto the steel cable. Two half-dishes of one static plate, that have a common diameter surface, will be inverted over these press-pieces and screwed together. The static plates are driven by yokes cycling around a drive wheel; these yokes surround the traction rope and press against the surfaces of the static plates. High demands are placed on the uniformity of the distribution, so that the motive power is picked up and transferred uniformly over all static plates located in the cycle. Now, in case of a certain irregularity, the entire motive power will be transferred via only one static plate to the traction element, and acceleration jolts result. Therefore this type of disc retarding conveyor, which will only allow a small motive power, is susceptible to breaks in the wire cable, and is less suitable for control of the conveyor path.

Due to the use of additional, known tractive elements made of high-strength Aramid with a large alternating bending strength, the problem of fatigue breaks due to limited alternating bending strength of the steel cable tractive elements will indeed be eliminated, but the static plate mounting and [lack of] uniformity of the force application is not satisfactory.

SUMMARY OF THE INVENTION

Thus it is the task of this invention, by the use of, in particular, noncorrosive, preferably flexural-resistant traction elements, to create a disc retarding conveyor that does not have the stated disadvantages and that in addition, will allow a large force transfer. In addition, an essentially universal, versatile applicability, and also a simple assembly and interchangeability of the static plates is desirable.

BRIEF DESCRIPTION OF THE DRAWINGS

The figures show:

FIG. 6: A top view of a disc retarding conveyor in a diverter/drive station (view B as per FIG. 7);

FIG. 7: A side view of the same diverter/drive station (view A as per FIG. 6); and also FIGS. 8a/b: A similar diverter/drive station as in FIGS. 6 and 7 with alternative designs of the drive forks and spoke elements.

DESCRIPTION OF PREFERRED EMBODIMENTS

Figure 1:
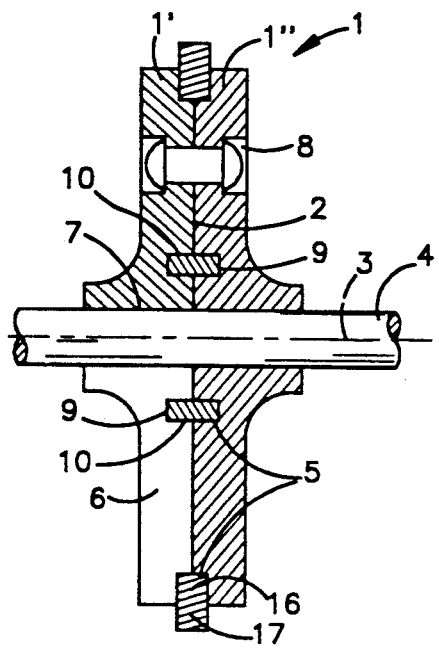
FIG. 1: A static plate, axial cross section.
Figure 2:
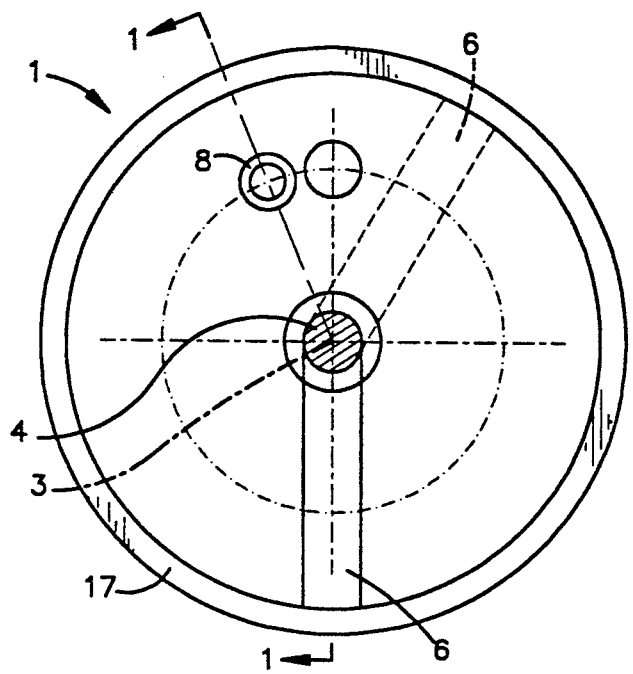
FIG. 2: The same static plate, left-side view.
Figure 3:
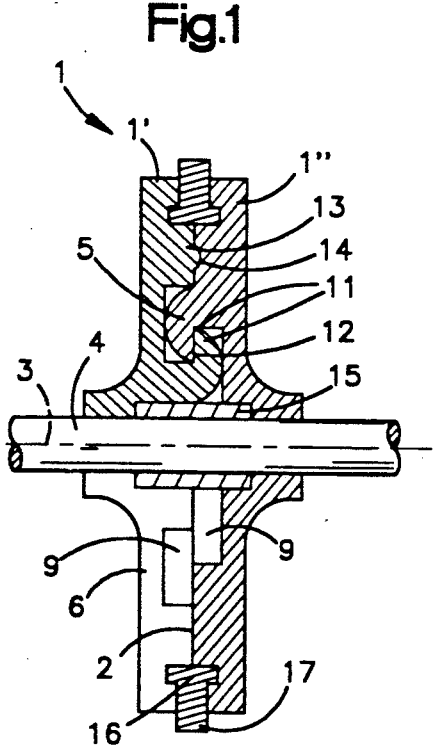
FIG. 3: An alternative design of a static plate, axial cross section.
Figure 4:
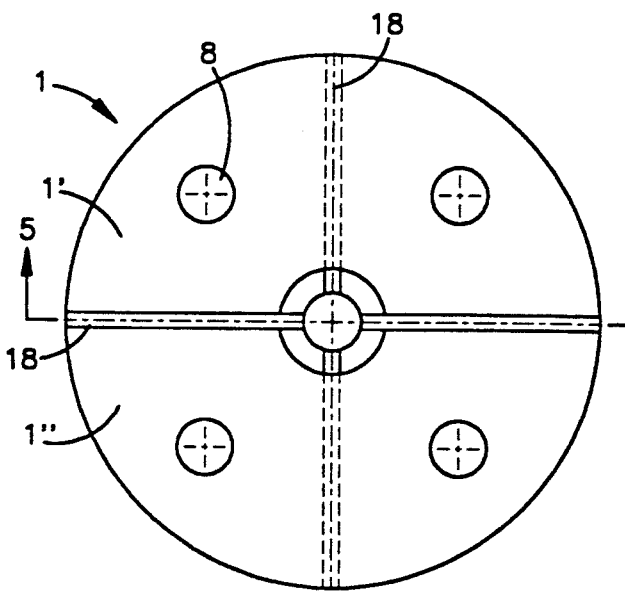
FIG. 4: A third design of a static disk, axial view.
Figure 3A:
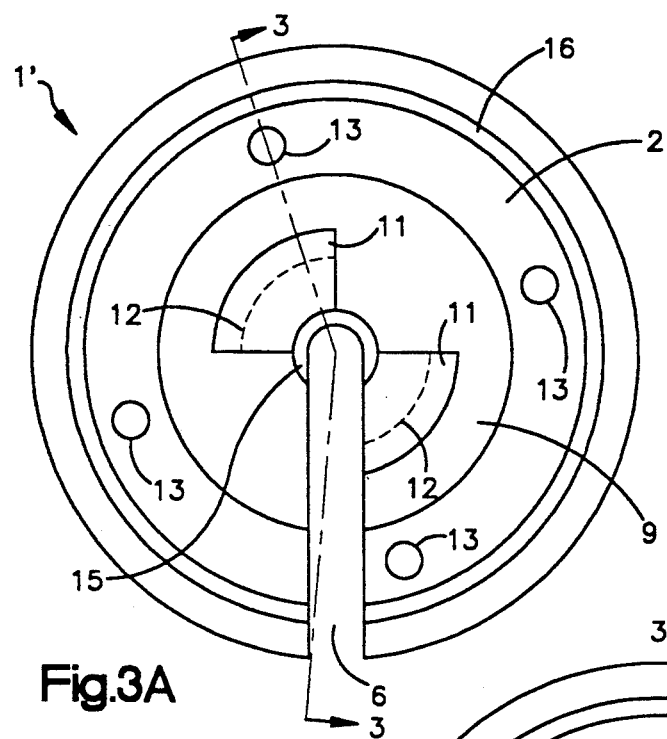
FIG. 3A: An axial view of one half of the static plate of FIG. 3.
Figure 3B:
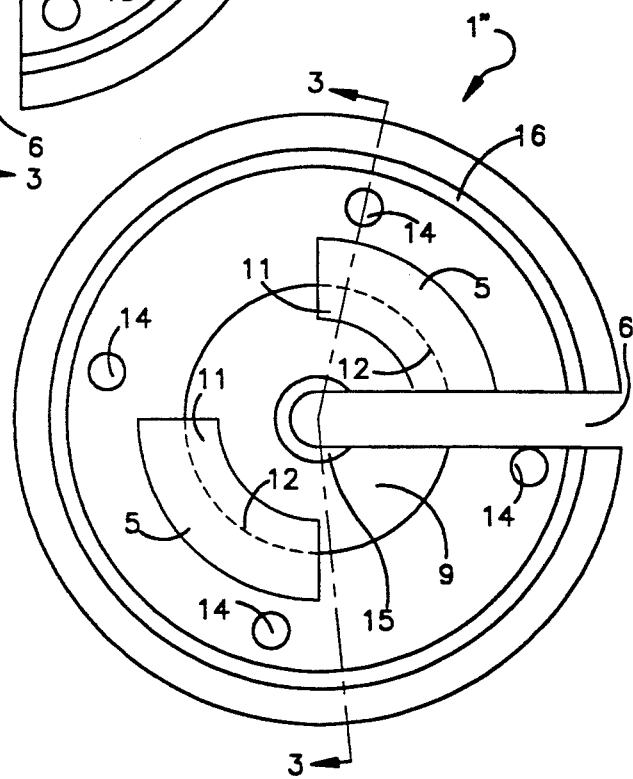
FIG. 3B: A view similar to the view of FIG. 3A, and showing the other half of the static plate of FIG. 3.
Figure 5:
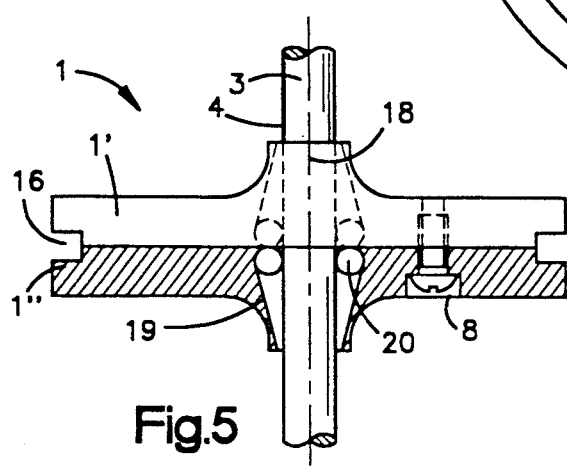
FIG. 5: The same static disk as in FIG. 4, axial cross section along line V—V.

This problem is solved by the fact that the static plates 1 are positioned in a plane 2 perpendicular to the axis 3 of the tractive element 4. They can be rotated concentrically to each other by means of circular, ring-like guide elements 5 and have a radial, horseshoe-like drilled hole 6, so that the plates are pushed singly onto the tractive elements and are locked to each other to prevent twisting, so that they cannot fall out of the tractive element again.

The drilled holes for the tractive elements are not formed in a straight line here, but rather are offset in the middle of the static plate by a small amount 7, e.g., 1 to 2 mm, at a diameter of the tractive element of 10 to 15 mm. When twisting the parts of the static plates against each other, the common drilled hole [lead] opening will be reduced in size due to its nonconcentric arrangement with respect to the rotational axis, so that the static plate will be elastically clamped in this manner onto the tractive element. Any backward turning and falling asunder of the parts of the static plate is prevented since they are securely joined to each other, that is, since they can be screwed or riveted to each other via drilled holes 8 on a common punched hole. Alternatively, or cumulatively, the drilled hole can also form a pointed angle with the axis of the static plate.

The concentric twisting ability of the parts of the static plate with respect to each other is generated, for example, by corresponding inner and outer guide rings, preferably by opposing circular grooves 9, into which a separate guide ring 10 is installed. In this manner, the two parts of the disc can be identical and manufactured from the same mold.

The parts of the static plate hold against each other if they have corresponding protrusions and leads or recesses on a circular ring, with perimeter claws 11 or back-cut edges 12, behind which the claws can grasp in place when turning, preferably where the protrusions and the leads are positioned opposite each other, and are offset by 180 degrees and take up a perimeter of more or less 90 degrees. Then it is possible that the identical halves of the static plates will be used from the same mold; they can be turned by at least 90 degrees in order to preferably attain in this manner a complete squeezing. The locking of the halves in place with respect to each other takes place preferably by means of indexed protrusions 13 and recesses 14 positioned opposite each other in the circular ring; after the twisting, they remain locked in place with regard to friction and shape.

The coupling-type connection of the two parts of the static plate can also be used to mount them by means of a pressed piece 15 securely attached to the tractive element.

The halves of the static plate have a common groove 16 over the perimeter to hold metallic or elastic wear-rings 17 of differing size, so that through suitable selection of these rings, the static plates can be adapted to the individual conveyor task and to the particular tube diameter, and so that a simple selection of the wear element is possible.

If the divided halves 1 and 1" of the static plate are again divided in half along a diameter 18 and one half is twisted by 90 degrees with respect to the other half and is centered and mounted with it by elements in the individual sectors, then an additional, advantageous, mountable static plate will be created. This unit can be screwed onto a pressed-on clamping piece 15, or it can be pressed on by conical slants 19 by using clamp dishes or spheres 20 that are thereby linked friction-tight to the tractive element.

Due to this described type of attachment of the static plate to the tractive element, it is possible to achieve both large transfer forces and essentially precise spacer settings of the discs with respect to each other. An increase in the transferred power is additionally possible, since the forks 21 that are pressed against the static plates on both sides of the traction element have their middle position on the ring diameter 22 of the revolving wheel. They are located at the end on a radial-like storage element 24 spring-loaded by an inner drive shaft 23 at a distance in the tangential direction, so that in case of an overload of a single static plate, this fork will flex somewhat, elastically, tangentially, and in this manner, a uniform fork support unit will be created.

To improve the uniformity of the revolution, at least two transverse rods 25 will support the traction element or the static plate per sector.

Expedient configurations of the article of the invention that will ensure, in particular, a uniform force application and a large force transfer to the static plates or to the through-running tractive element, a simple, redetachable static plate mount and exchangeability of the static plate, and also an essentially universal, multicurve applicability of the disc retarding conveyor, are contained in the claims.

Additional details, properties and advantages of the article of the invention arise from the preceding description of the pertinent drawings, that are illustrated in the preferred design forms of a disc retarding conveyor as per this invention. The preceding components and also the components claimed and used in the sample designs described as per this invention, are not subject in their size, shape, material selection and technical design, to any particular exceptional conditions, so that the selection criteria known in the particular area of application can be used without restriction.

Naturally, it is understood that diverter or drive stations as per FIGS. 6 to 8b represent advantageous elements of a disc retarding conveyor, regardless of the actual configuration of the static plate and the mounting of the static plate.

I claim:

1. Disc retarding conveyor, consisting at least of a solid tractive element (4) and mounted on this tractive element, at least two-part static plates (1) separated from each other at a distance in the tractive direction, where the static plates (1) are divided in the cross-sectional plane (2) of the tractive element (4), and having at least one radial cut hole (6) each, that allows an essentially concentric application of the half of the static plate (1', 1") onto the tractive element (4), characterized by the fact that the halves of the static plate have centering elements (5; 11; 16) corresponding to each other with respect to mutual twistability, and that the halves of the static plate (1', 1") can be securely clamped on the tractive element (4), either directly or indirectly, by turning the halves of the static plate with respect to each other.

2. Disc retarding conveyor, consisting at least of a solid tractive element (4) and mounted on this tractive element, at least two-part static plates (1) separated from each other at a distance in the tractive direction, where the static plates (1) are divided in the cross-sectional plane (2) of the tractive element (4), and having at least one radial cut hole (6) each that allows an essentially concentric application of the half of the static plate (1', 1") onto the tractive element (4), characterized by the fact that the halves of the static plate have centering elements (5; 11; 16) corresponding to each other with respect to mutual twistability, and that the halves of the static plates (1', 1") can be securely clamped on the tractive element (4), either directly or indirectly, by turning the halves of the static plate with respect to each other, the halves of the static plate (1', 1") can be turned with respect to each other, by means of concentric, circular-ringed, or segmented circular-ringed shaped guide surfaces.

3. Disc retarding conveyor as per claim 2, characterized by the fact that the halves of the static plate (1', 1") have whole, or segmented, groove rings (10; 17) located concentrically with respect to each other, in which a ring or at least a ring segment, is installed for concentric twistability of the two halves.

4. Disc retarding conveyor as per claim 1, characterized by the fact that drilled holes in the two halves of the static plate (1', 1") are provided to hold the tractive element (4) in the common contact plane (cross-sectional plane 2) in an axially offset position with respect to each other in the final mounted position.

5. Disc retarding conveyor as per claim 1, characterized by the fact that the halves of the static plate (1', 1") have a common groove (16) over the outer perimeter, and have therein a circular, annular element (17), in particular as a wear element, for adaptation of the diameter and/or of the material to the particular problem and/or to the diameter of the conveyor tube.

6. Disc retarding conveyor as per claim 1, characterized by the fact that the halves (1', 1") are of identical design.

7. Disc retarding conveyor comprising:
a solid tractive element (4);
at least two-part static plates (1) mounted on the tractive element and separated from each other at a distance in the tractive direction;
each static plate (1) being divided in a cross-sectional plane (2) on the tractive element (4) to provide two halves (1', 1") of the static plate, each half of the static plate having at least one radial cut hole (6) that allows an essentially concentric application of the half of the static plate onto the tractive element, the halves of the static plate having centering elements (5; 11; 16) corresponding to each other with respect to mutual twistability, the halves of the static plate being rotatable relative to each other to securely clamp the halves of the static plate on the tractive element, either directly or indirectly.

8. Disc retarding conveyor, consisting at least of a solid tractive element (4) and mounted on this tractive element, at least two-part static plates (1) separated from each other at a distance in the tractive direction, where the static plates (1) are divided in the cross-sectional plane (2) of the tractive element (4), and having at least one radial cut hole (6) each, that allows an essentially concentric application of the half of the static plate (1', 1") onto the tractive element (4), the halves of the static plate (1', 1") are mounted or are mountable by means of a retaining piece (15) mounted to the tractive element (4), characterized by the fact that the halves of the static plate have centering elements (5; 11; 16) corresponding to each other with respect to mutual twistability, and that the halves of the static plate (1', 1") can be securely clamped on the tractive element (4) by turning the halves of the static plate with respect to each other.

9. Disc retarding conveyor, consisting at least of a solid tractive element (4) and mounted on this tractive element, at least two-part static plates (1) separated from each other at a distance in the tractive direction, where the static plates (1) are divided in the cross-sectional plane (2) of the tractive element (4), and having at least one radial cut hole (6) each, that allows an essentially concentric application of the half of the static plate (1', 1") onto the tractive element (4), characterized by the fact that the halves of the static plate have centering elements (5; 11; 16) corresponding to each other with respect to mutual twistability, and that each of the halves of the plate has surface means for engaging, either directly or indirectly, the tractive element to allow the halves of the static plate to be securely clamped to the tractive element when the halves of the static plate are turned relative to each other, and that the halves of the static plate (1', 1") have circular, annular, segment-like, concentric protrusions (11) and through-holes or recesses, preferably offset by about 90° each, whereby the protrusions extend preferably over a smaller circular angle than the through-holes or recesses, and that the protrusions have claws or the through-holes have back-cut surfaces (12) corresponding to the recesses, these back-cut surfaces meshing with each other when twisting the halves of the static plate.

10. Disc retarding conveyor as per claim 9, characterized by the fact that the two halves of the static plate (1', 1") have elevations (13) and recesses (14) on a common, concentric contact, circular, ring surface that prevent the parts of the plate from being able to twist with respect to each other, the twisting is prevented by form-fitting and/or by friction-fitting.

11. Disc retarding conveyor as per claim 9, characterized by the fact that the halves of the static plates (1', 1") have a common groove (16) over the outer perimeter, and have therein a circular, annular element (17), in particular as a wear element, for adaptation of the diameter and/or of the material to the particular problem and/or to the diameter of the conveyor tube.

12. Disc retarding conveyor as per claim 1, characterized by the fact that the static plates have perforated holes corresponding to each other, and are held with respect to each other by screws, rivets or such in the particular twist position.

13. Disc retarding conveyor as per claim 8, characterized by the fact that the halves of the static plate (1', 1") have circular, annular, segment-like, concentric protrusions (11) and through-holes or recesses, preferably offset by about 90 degrees each, whereby the protrusions extend preferably over a smaller circular angle than the through-holes or recesses, and that the protrusions have claws or the through-holes have back-cut surfaces (12) corresponding to the recesses, these back-cut surfaces meshing with each other when twisting the halves of the static plate.

14. Disc retarding conveyor as per claim 8, characterized by the fact that the two halves of the static plate (1', 1") have elevations (13) and recesses (14) on a common, concentric contact, circular, ring surface that prevent the parts of the plate from being able to twist with respect to each other; the twisting is prevented by form-fitting and/or by friction-fitting.

15. Disc retarding conveyor as per claim 1, characterized by the fact that the static plates (1) are run by or driven by forks (21) at the wheels of a diverter or drive station, and the forks are joined with the shaft by at least one spring element (24) acting elastically in the tangential direction.

16. Disc retarding conveyor as per claim 5, characterized by at least one spring spoke (24).

17. Disc retarding conveyor as per claim 16, characterized by the fact that due to at least two transverse rods per static plate, the axial diversion forces are absorbed at one spoke wheel or similar item, for the tractive element.

* * * * *